United States Patent [19]

Riecke

[11] 4,250,281
[45] Feb. 10, 1981

[54] MELT PROCESS FOR PREPARING COPOLYESTERS USING TRIARYLPHOSPHINE CATALYSTS

[75] Inventor: Edgar E. Riecke, Webster, N.Y.

[73] Assignee: Eastman Kodak Company, Rochester, N.Y.

[21] Appl. No.: 22,542

[22] Filed: Mar. 21, 1979

[51] Int. Cl.$^3$ .................. C08L 67/02; C08G 63/04
[52] U.S. Cl. .................................. 525/444; 528/286
[58] Field of Search ................................. 525/444

[56] References Cited

U.S. PATENT DOCUMENTS

| | | | |
|---|---|---|---|
| 2,989,499 | 6/1961 | Linville et al. | 260/45.75 |
| 3,039,999 | 6/1962 | Linville et al. | 528/286 |
| 3,050,809 | 9/1962 | Linville | 528/286 |
| 3,496,137 | 2/1970 | Stewart et al. | 260/45.9 |
| 3,525,715 | 8/1970 | Hrach et al. | 528/300 |
| 3,546,320 | 12/1970 | Duling et al. | 525/444 |
| 3,558,557 | 1/1971 | Hrach et al. | 528/300 |
| 3,595,835 | 3/1971 | Pilz et al. | 260/45.85 |
| 3,600,365 | 8/1971 | Brady | 252/426 |
| 3,609,118 | 9/1971 | Pilz et al. | 260/45.7 |
| 3,772,405 | 11/1973 | Hamb | 525/444 |
| 4,113,783 | 9/1978 | Malpass et al. | 260/606.5 P |

FOREIGN PATENT DOCUMENTS

| | | |
|---|---|---|
| 45-38245 | 12/1970 | Japan . |
| 48-37330 | 11/1973 | Japan . |
| 1039112 | 8/1966 | United Kingdom . |
| 1060401 | 1/1967 | United Kingdom . |
| 1253126 | 11/1971 | United Kingdom . |

OTHER PUBLICATIONS

*Chemical Abstract*, Hrach et al., vol. 73, (1970) #99925x.
*Chemical Abstracts*, Matsuzawa et al., vol. 81, (1974) #78536w.
*Chemical Abstracts*, Terasawa et al., vol. 82, (1975) #99152d.
Yamadera et al., *J. Pol. Sci.*, 5(A-1), (1967) pp. 2259-2268.

*Primary Examiner*—Wilbert J. Briggs, Sr.
*Attorney, Agent, or Firm*—J. Lanny Tucker

[57] ABSTRACT

Copolyesters having random sequence distributions can be prepared in the melt phase in the presence of triarylphosphine catalysts. These copolyesters are prepared by reacting a first polyester with either a second polyester or polyester precursors. They are useful for the formulation of films, fibers, binders, adhesives, molded articles, sheeting and lacquers.

18 Claims, No Drawings

MELT PROCESS FOR PREPARING COPOLYESTERS USING TRIARYLPHOSPHINE CATALYSTS

BACKGROUND OF THE INVENTION

1. Field of the Invention

This invention relates to a process for the preparation of copolyesters. More particularly, it relates to the preparation of copolyesters having random sequence distributions from the interaction of two or more polyesters or one or more polyesters and polyester precursors in a melt phase in the presence of triarylphosphine catalysts.

2. Description of the Prior Art

Phosphites and phosphates are known to be useful as polyester stabilizers as disclosed, for example, in British Pat. No. 1,060,401 (published Mar. 1, 1967). However, these compounds are generally poor catalysts for melt phase copolyester formation as shown below in Examples 22 and 28.

U.S. Pat. No. 3,053,809 (issued Sept. 11, 1962 to Linville) discloses the use of metal-phosphine complexes as catalysts for linear polyester formation. This patent specifically teaches (see Column 1, lines 48-52) that the organic phosphines alone do not act as catalysts to any substantial extent.

It is known that copolyesters can be prepared by a melt phase process as disclosed, for example, in U.S. Pat. No. 3,772,405 (issued Nov. 13, 1973 to Hamb). This patent describes a preparation of copolyesters by the interaction of a polyester, a dicarboxylic acid and an aromatic diester with or without standard transesterification catalysts, e.g., alkali metals, alkaline earth metals, titanium, tin, antimony and lead.

However, in many instances, copolyesters prepared by the Hamb process have block sequence distributions. This means that the units making up the copolyesters tend to cluster in blocks of particular units rather than being randomly distributed throughout the copolyester chain. Generally, block copolyesters are not easily formulated into useful products because they tend to have higher melting points than is desirable. This tendency in polyesters to cluster in blocks also causes the reaction mixture of polymers to become increasingly heterogeneous as the reaction proceeds. In other words, the block polymers formed become less soluble in each other. This lack of solubility causes clumps of polymer to form until eventually, the entire mass solidifies. This problem is especially prominent for copolyesters prepared from polyesters formed from alkylene glycols higher in molecular weight than ethylene glycol.

To overcome this problem of heterogeneity, workers in the art have tried to prepare copolyesters by adding the reactants gradually to the reaction vessel. However, this gradual addition lengthens reaction times. Extended reaction times can be disadvantageous for copolyesters susceptible to decomposition from prolonged exposure to high reaction temperatures.

Hence, there is a need in the art for a melt phase process for preparing copolyesters having random sequence distributions which is not limited, in practicality, to a limited group of starting materials. Further, it is desirable that these copolyesters be prepared over shorter reaction times in order to avoid their prolonged exposure to high reaction temperatures.

SUMMARY OF THE INVENTION

The present invention provides a melt phase process for preparing copolyesters having generally more random sequence distributions. This process also unexpectedly provides some measure of control over the randomness of the resulting copolyesters. This control is not available with prior art melt phase processes. Reaction mixtures useful in this process are homogeneous in nature throughout the melt phase reaction and do not harden prematurely. Furthermore, reaction time for the process is generally shorter than that necessary for preparing copolyesters by prior art processes.

More particularly, this invention provides a melt phase process for preparing a copolyester in the presence of a triarylphosphine catalyst. The copolyester is prepared by reacting a first polyester with either a second polyester or polyester precursors. The triarylphosphine catalyst has a boiling point in the range of from about 200° to about 500° C.

DESCRIPTION OF THE PREFERRED EMBODIMENTS

The triarylphosphine catalysts useful in the practice of this invention are generally those having boiling points in the range of from about 200° to about 500° C., and preferably from about 300° to about 400° C. These boiling points are measured at atmospheric pressure. Exemplary catalysts include compounds having the formula

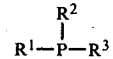

wherein each of $R^1$, $R^2$ and $R^3$ is aryl, preferably of 6 to 18 carbon atoms, e.g., phenyl, naphthyl, anthryl, p-chlorophenyl, tolyl, xylyl and methoxyphenyl. More preferably, each of $R^1$, $R^2$ and $R^3$ is aryl of 6 to 12 carbon atoms, and most preferably, each is phenyl.

Representative triarylphosphines include triphenylphosphine, tris(p-methoxyphenyl)phosphine, tri(m-tolyl)phosphine, tris(p-toly)phosphine, trinaphthylphosphine and tris(p-chlorophenyl)phosphine.

The concentration of catalyst useful in the practice of this invention is generally in the range of from about 0.1 to about 50 percent, by weight, based upon total weight of the polyesters and polyester precursors. Preferably, the concentration of catalyst is in the range of from about 0.1 to about 10 percent, and most preferably, from about 0.5 to about 5 percent, by weight. As illustrated in Examples 13-21 below, some control can be exercised over the degree of randomness in resulting copolyesters by the choice of concentration of triarylphosphine. Mixtures of triarylphosphines can be used if desired.

The preparation of copolyesters in the melt phase is known in the art. Generally, a standard melt phase process is carried out by mixing the reactants and reacting them at a temperature less than 500° C. and preferably in the range of from about 200° to about 300° C., and at a pressure in the range of from about 0.001 to about 10 mmHg and preferably in the range of from about 0.001 to about 0.5 mmHg. The reaction conditions are such that all reactants are in the melt phase, but no reactants are vaporized. Typical reactants are polyesters, copolyesters and polyester precursors, all of which are described below.

As used in this specification and in the claims, the term "melt phase process" includes both melt phase and melt-solid techniques, as would be understood by one of ordinary skill in the polyester art. The melt-solid technique is the same as the melt phase technique except that it comprises the additional steps of: crystallizing the copolyester obtained in the melt phase; heating the crystallized copolyester in the solid phase to a temperature below its melting point but sufficiently high to continue polymerization and maintaining that temperature until a desired molecular weight is reached.

Crystallization is a known technique. It can be achieved by soaking the copolyester in a suitable organic solvent at ambient temperature for from about 1 minute to about 24 hours. Suitable organic solvents include acetone, 2-pentanone, ethyl acetate, acetic acid and toluene. The crystallized copolyester is then separated from the organic solvent by filtration or another standard technique.

Copolyester preparation in the melt phase includes the splitting-out of simple molecules, e.g., water, methanol, ethanol, acetic acid, and propionic acid. In order to drive the reaction equilibrium in the direction of copolyester formation, it is necessary that these by-products be removed. Removal can be accomplished with standard techniques, e.g. distillation, preferably under vacuum, or bubbling nitrogen or another inert gas through the copolyester melt. Distillation under vacuum is a preferred technique.

In one embodiment of this invention, a copolyester is prepared by reacting a first polyester with a second polyester. These polyesters can be reacted in any desired weight ratio. Preferably, each of these polyesters has a melting point less than about 500° C. at atmospheric pressure. In another embodiment, a copolyester is prepared by reacting a first polyester with polyester precursors. These reactants can be mixed in any desired weight ratio of polyester to precursors. As used throughout this specification and in the claims, each of the terms "first polyester" and "second polyester" is meant to include a mixture of polyesters, a mixture of polyesters and copolyesters and a mixture of copolyesters. Also, the term "polyester precursor" is meant to include a mixture of polyester precursors. Typically, the polyester precursors are present in substantially equal molar amounts.

More particularly, the process of this invention is useful for preparing a copolyester by reacting a first polyester with either a second polyester, each polyester having recurring units of the formula (I):

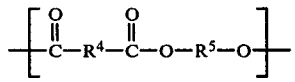

or with at least one polyester precursor described by each of the following formulae:

In these formulae, each of $R^4$, $R^5$, $R^7$ and $R^{10}$ is a divalent aliphatic, alicyclic or aromatic radical, preferably of 1 to 50 carbon atoms and containing carbon and hydrogen atoms, and optionally ether oxygen atoms. Typical divalent aliphatic, alicyclic and aromatic radicals include alkylene, cycloalkylene, arylene, alkylidene, alkylenearylene, alkylenecycloalkylene, alkylenebisarylene, cycloalkylenebisalkylene, arylenebisalkylene, alkylene-oxy-alkylene, alkylene-oxy-arylene-oxy-alkylene and alkylidenearylene. Many useful divalent aliphatic, alicyclic or aromatic radicals are divalent hydrocarbons.

Preferably, each of $R^4$, $R^5$, $R^7$ and $R^{10}$ is alkylene of 1 to 30 carbon atoms, such as methylene, ethylene, propylene, iso-propylene, etc., cycloalkylene of 4 to 10 carbon atoms, such as cyclobutylene, 1,3-cyclopentylene, 1,4-cyclohexylene, etc., or arylene, of 6 to 30 carbon atoms, such as phenylene, naphthylene, etc. More preferably, each of $R^4$, $R^7$ and $R^{10}$ is arylene and $R^5$ is alkylene.

Each of $R^6$ and $R^8$ is hydroxy or alkoxy, preferably of 1 to 20 carbon atoms, e.g. methoxy, ethoxy, n-propoxy, isomers thereof, etc. Preferably, each of $R^6$ and $R^8$ is hydroxy.

Each of $R^9$ and $R^{11}$ is a monovalent aliphatic, alicyclic or aromatic radical, preferably of 1 to 20 carbon atoms and containing carbon and hydrogen atoms and, optionally, ether oxygen atoms. The definition of divalent aliphatic, alicyclic and aromatic radicals given above in describing $R^4$, $R^5$, $R^7$ and $R^{10}$ is applicable for the definition of monovalent aliphatic, alicyclic and aromatic radicals except for the difference in valence and number of carbon atoms. Preferably, each of $R^9$ and $R^{11}$ is alkyl, cycloalkyl or aryl.

Contemplated as equivalents of the listed examples of $R^4$, $R^5$, $R^6$, $R^7$, $R^8$, $R^9$, $R^{10}$ and $R^{11}$ are divalent or monovalent radicals having one or more inert substitutents, such as alkyl or alkoxy of 1 to 4 carbon atoms, halogens, nitro, amino provided, however, that these substituents do not adversely affect the properties of the polyester precursors or polyesters or diminish their ability to polymerize in the melt phase.

Useful polyester precursors include those precursors disclosed in U.S. Pat. No. 3,772,405 (issued Nov. 13, 1973 to Hamb). Exemplary precursors include dicarboxylic acids and ester derivatives thereof, e.g. succinic acid, glutaric acid, adipic acid, pimelic acid, azelaic acid, thiodiglycolic acid, fumaric acid, cyclohexane-1,3-dicarboxylic acid, cyclohexane-1,4-dicarboxylic acid, 2,5-norbornanedicarboxylic acid, phthalic acid, isophthalic acid, terephthalic acid, t-butylisophthalic acid, phenylenediacetic acid, 1,4-naphthalenedicarboxylic acid, 4,4'-diphenic acid and 4,4'-sulfonyldibenzoic acid.

Particularly useful precursors include those wherein $R^{10}$ is arylene derived from any bisphenol, such as, for example, bisphenol A; 2,2-bis(4-hydroxy-3,5-dichlorophenyl)propane{tetrachlorobisphenol A}; 1-phenyl-1,1-bis(4-hydroxyphenyl)ethane; bis(4-hydroxyphenyl)methane; 1,4-naphthalenediol; and bis(2-ethyl-4-hydroxyphenyl)-di-p-tolylmethane. Other useful bisphenols are disclosed in the Hamb patent.

The copolyesters prepared by the process of this invention are characterized by having generally random sequence distributions. Generally, sequence distribution is determined from nuclear magnetic resonance spectra according to the method described by Yamadera et al in Journal of Polymer Science, Vol. 5 (A-1), 1967, pp. 2259-2268. The authors of this reference reported on their measurement of the nuclear magnetic resonance spectra of several kinds of copolyesters. Proton signals due to certain linkages in the copolyesters were observed and the average sequence length and the degree of randomness in the copolyesters were calculated from the intensities of the signals.

The parameter "B" is a standard measure of the degree of randomness in a polyester or copolyester. It is defined as the sum of the probabilities of reacted copolyester units following other units in the copolyester chain. For example, in the case of a polyester formed from a diacid and two diols, B is the sum of two probabilities: (1) the probability that a first diol unit is followed in the copolyester chain by a second diol unit, and (2) the probability that a second diol unit is followed in the copolyester chain by a first diol unit. A random copolyester has a B value of 1. If $B<1$, the units have clustered in blocks. The extreme case, where $B=0$, is a mixture of homopolymers. Similarly, when $B>1$ in a polyester, the average sequence length of each unit is shorter. A completely alternating polyester has a B value of 2. Thus, as B approaches 1, but does not exceed 1, the polyester is increasing in random sequence distribution.

The copolyesters prepared by the process of this invention typically have B values greater than about 0.6 and less than 1.0. When the B value is less than 0.5 for copolyesters prepared by the present invention, it is generally greater than the B value for a copolyester prepared without a triarylphosphine catalyst, as illustrated in Example 6 below. It is clear that some copolyesters having B values greater than 0.5 can be made without triarylphosphine catalysts. However, the process of this invention provides a means of preparing a greater number of copolyesters more rapidly, more randomly and with less danger of hardening or set up during reaction. It also provides some measure of control of the degree of randomness in copolyesters.

The copolyesters described herein can be further characterized by their inherent viscosities and glass transition temperatures. Generally, before crystallization, the copolyesters have inherent viscosities in the range of from about 0.1 to about 1, and preferably in the range of from about 0.2 to about 1. After crystallization, and before solid phase polymerization the inherent viscosities are generally in the range of from about 0.4 to about 2. The inherent viscosities are measured at 25° C. in one or more suitable solvents including a 1:1 (by weight) phenol:chlorobenzene mixture, 1,1,2,2-tetrachloroethane, m-cresol and others known to those skilled in the art at a concentration of 0.25 g copolyester per 100 ml of solution.

Typically, after crystallization and before solid phase polymerization, the copolyesters have glass transition temperatures in the range of from about $-50°$ to about 300° C., and preferably from about 50° to about 250° C. The glass transition temperatures are virtually unchanged by solid phase polymerization. The glass transition temperature (Tg), can be determined by any convenient method suitable for this purpose. For example, one such method is differential scanning calorimetry as disclosed in *Techniques and Methods of Polymer Evaluation,* Volume 2, Marcel Dekker, Inc., N.Y., 1970.

Because of their improved characteristics of solvent solubility and moldability, the copolyesters prepared by the process of this invention are useful for the formulation of films, either cast or extruded, which are flexible and tough. These films are useful in many applications including, for example, as photographic and non-photographic supports. The copolyesters are also useful as fibers, molded articles, adhesives, sheeting, lacquers and binders. Typical uses in photographic materials are described, for example, in U.S. Pat. No. 3,772,405 of Hamb.

This invention is further illustrated by the following examples of its practice.

EXAMPLES 1-8

Preparation of Copolyesters From a Polyester and Polyester Precursors

Copolyesters prepared using triarylphosphine catalysts are designated as Examples. Copolyesters prepared without triarylphosphine catalysts are designated as Controls. The copolyesters of the Examples are compared to the copolyesters of the Controls. The following Table I lists the copolyesters prepared and their properties.

In Example 1, a mixture of poly(tetramethylene terephthalate) (8.8 g, 0.04 moles), terephthalic acid (6.7 g, 0.04 moles), bisphenol A diacetate (12.5 g, 0.04 moles) and triphenylphosphine catalyst (0.28 g) was stirred in the dry state for 5 minutes under an inert gas atmosphere in a 50 ml reaction vessel. The mixture was then heated to 265° C. at atmospheric pressure. Within 2-4 minutes, the mixture became molten and stirring was resumed and continued for 4 hours at 265° C. The pressure was then reduced to 0.1 mmHg and the reaction allowed to proceed for another 2 hours. The resulting copolyester was then cooled to room temperature.

This procedure was repeated except that the catalyst was omitted. The resulting copolyester solidified soon after the pressure was reduced.

Examples 2-8 were carried out by the procedure used in Example 1 except that equivalent amounts of different starting polyesters were reacted as indicated in Table I below. Also, 1,3-phenylene diacetate was reacted in place of bisphenol A in Example 7; and 2-methylisophthalic acid was reacted in place of terephthalic acid in Example 8.

The data listed in Table I illustrates that, in general, the use of a triarylphosphine catalyst in the melt process promotes the preparation of more random copolyesters having B values greater than 0.5. Even when substantially blocked copolyesters are produced with or without catalyst, as in Example 6, use of the catalyst provides greater than 60% more randomness. The data also shows that where non-use of catalyst provides relatively random copolyesters ($B>0.5$), as in Examples 2 and 5, use of catalyst produces even more randomness.

TABLE I

|  | Copolyester | Catalyst* Amount (wt%) | I.V. | Tg(°C.) | B |
|---|---|---|---|---|---|
| Example 1 | starting polyester: poly(tetramethylene terephthalate) poly(tetramethylene: 4,4'-isopropylidenediphenylene terephthalate 50:50) | 1.0 | 0.47 | 96 | 0.86 |
| Control | poly(tetramethylene: 4,4'-isopropylidenediphenylene terephthalate 50:50) | 0 | 0.21 | 46 | 0.24 |

TABLE I-continued

| Copolyester | | Catalyst* Amount (wt%) | Copolyester Properties | | |
|---|---|---|---|---|---|
| | | | I.V. | Tg(°C.) | B |
| Example 2 | starting polyester: poly(trimethylene terephthalate) poly(trimethylene: 4,4'-isopropylidenediphenylene terephthalate 50:50) | 1.0 | 0.39 | 105 | 0.88 |
| Control | poly(trimethylene: 4,4'-isopropylidenediphenylene terephthalate 50:50) | 0 | 0.32 | 108 | 0.72 |
| Example 3 | starting polyester: poly(hexamethylene terephthalate) poly(hexamethylene: 4,4'-isopropylidenediphenylene terephthalate 50:50) | 1.0 | 0.44 | 82 | 0.91 |
| Control | poly(hexamethylene: 4,4'-isopropylidenediphenylene terephthalate 50:50) | 0 | 0.32 | 67 | 0.43 |
| Example 4 | starting polyester: poly(decamethylene terephthalate) poly(decamethylene: 4,4'-isopropylidenediphenylene terephthalate 50:50) | 1.0 | 0.41 | 53 | 0.95 |
| Control | poly(decamethylene: 4,4'-isopropylidenediphenylene terephthalate 50:50) | 0 | 0.21 | 16 | 0.22 |
| Example 5 | starting polyester: poly(1,4-cyclohexylenedimethylene terephthalate) poly(1,4-cyclohexylenedimethylene: 4,4'-isopropylidene-diphenylene terephthalate 50:50) | 1.0 | 0.57 | 126 | 0.94 |
| Control | poly(1,4-cyclohexylenedimethylene: 4,4'-isopropylidene-diphenylene terephthalate 50:50) | 0 | 0.40 | 143 | 0.63 |
| Example 6 | starting polyester: poly(2,2-dimethyl-1,3-propylene terephthalate) poly(2,2-dimethyl-1,3-propylene: 4,4'-isopropylidene-diphenylene terephthalate 50:50) | 1.0 | insoluble | 78,209 | 0.27 |
| Control | poly(2,2-dimethyl-1,3-propylene: 4,4'-isopropylidene-diphenylene terephthalate 50:50) | 0 | insoluble | 52,61 | 0.16 |
| Example 7 | starting polyester: poly(tetramethylene terephthalate) poly(tetramethylene: 1,3-diphenylene terephthalate 50:50) | 1.0 | 0.40 | 82 | 0.92 |
| Control | poly(tetramethylene: 1,3-diphenylene terephthalate 50:50) | 0 | 0.37 | 62 | 0.40 |
| Example 8 | starting polyester: poly(tetramethylene 2-methylisophthalate) poly(tetramethylene: 4,4'-isopropylidenediphenylene 2-methylisophthalate 50:50) | 1.0 | 0.28 | 53 | 0.71 |
| Control | poly(tetramethylene: 4,4'-isopropylidenediphenylene 2-methylisophthalate 50:50) | 0 | 0.31 | 53 | 0.04 |

*Catalyst used was triphenylphosphine.

EXAMPLES 9–11

Preparations of Copolyester Using Various Triarylphosphines

As previously indicated, the catalysts useful in this invention can comprise a variety of aryl moieties. The following Examples illustrate some of the useful catalysts.

Poly(tetramethylene: 4,4'-isopropylidenediphenylene terephthalate 50:50) was prepared for each of these examples by the procedure described in Example 1 except that a different catalyst was used for each example. Table II lists the particular catalysts and the physical properties of the resulting copolyesters.

TABLE II

| Example | Catalyst | Amount (% wt.) | Copolyester | | |
|---|---|---|---|---|---|
| | | | I.V. | Tg(°C.) | B |
| 9 | tris(p-methoxy-phenyl)phosphine | 1.0 | 0.46 | 99 | 0.84 |
| 10 | tris(m-tolyl)- | 1.0 | 0.46 | 100 | 0.92 |
| 11 | tris(p-tolyl)-phosphine | 1.0 | 0.38 | 95 | 0.90 |

EXAMPLE 12

Crystallization and Solid Phase Polymerization

This example illustrates the melt-solid process of the present invention.

Poly(decamethylene: 4,4'-isopropylidenediphenylene terephthalate 50:50) was prepared from poly(decamethylene terephthalate), terephthalic acid and bisphenol A diacetate by the procedure described in Example 1. A sample of this copolyester was ground to a size small enough to pass through a 2 mm screen and placed in acetone (1.1 g copolyester per 1 ml acetone). The polyester crystallized after being allowed to stand in the acetone for 24 hours. The copolyester was then filtered and dried at 125° C. under vacuum. The crystallized copolyester had an I.V. of 0.40 (measured in 1:1 (weight ratio) phenol:chlorobenzene).

A sample of this crystallized copolyester was polymerized in solid phase by heating to and maintaining it at 225° C. for 3 hours and then at 235° for 4 hours. The cooled copolyester had an inherent viscosity of 0.61 (measured in 1:1 phenol:chlorobenzene). This increase in I.V. indicates an increase in molecular weight effected by the polymerization.

EXAMPLES 13–21

Copolyester Preparation with Varying Catalyst Concentration

Poly(tetramethylene: 4,4'-isopropylidenediphenylene terephthalate 50:50) was prepared in each of these examples by the procedure described in Example 1 except that varying concentrations of triphenyl phosphine catalyst were used. The catalyst concentrations and properties of the resulting copolyesters are listed in the following Table III.

TABLE III

| | Catalyst Concentration (wt. %) | Copolyester Properties | | |
|---|---|---|---|---|
| | | I.V. | Tg(°C.) | B |
| Example 13 | 0.2 | 0.24 | 65 | 0.51 |
| Example 14 | 0.5 | 0.34 | 100 | 0.75 |
| Example 15 | 0.8 | 0.47 | 96 | 0.86 |
| Example 16 | 1.0 | 0.46 | 105 | 0.86 |
| Example 17 | 1.5 | 0.42 | 105 | 0.85 |
| Example 18 | 2.0 | 0.45 | 103 | 0.87 |
| Example 19 | 3.0 | 0.49 | 105 | 0.85 |
| Example 20 | 5.0 | 0.37 | 116 | 0.84 |
| Example 21 | 10.0 | 0.32 | 118 | 0.81 |

EXAMPLE 22

Catalyst Comparison

This is a comparative example which illustrates the improvement in randomness obtained triarylphosphine catalyst over phosphorus-containing catalysts taught in the art, particularly those taught in British Patent Specification No. 1,060,401.

The procedure described in Example 1 was used to prepare poly(tetramethylene: 4,4'-isopropylidenediphenylene terephthalate 50:50) except that each of triphenylphosphite and triphenylphosphate was used as catalyst (2 wt.%) in separate runs.

In each run, large quantities of the reactants failed to react. When triphenylphosphite was used as catalyst, the resulting copolyester had a B value of 0.18. When triphenyl phosphate was used, the resulting copolyester had a B value of 0.17. Clearly, these copolyesters are considerably less random in sequence distribution than the comparable copolyester of Example 1 which had a B value of 0.86.

EXAMPLES 23–27

Copolyester Preparation from Two Polyesters

These comparative examples illustrate the advantages of greater randomness and shorter reaction time when a triarylphosphine catalyst is used to form copolyesters from two polyesters.

For Example 23, a mixture of poly(tetramethylene 2-methylisophthalate) (10.0 g, 0.043 mole), poly(4,4'-isopropylidenediphenylene 2-methylisophthalate) (15.9 g, 0.043 mole) and triphenylphosphine catalyst (0.26 g, 1.0 wt.%) was reacted at 260° with stirring under a nitrogen atmosphere for 3 hours. Samples of the resulting melt were taken at 20 minute intervals in order to monitor B values.

Example 24 was a melt reaction at 260° C. of poly(ethylene 2-methylisophthalate) (6.6 g, 0.033 mole) and poly(4,4'-isopropylidenediphenylene 2-methylisophthalate) (12.0 g, 0.032 mole) in the presence of triphenylphosphine catalyst (0.19 g, 1.0 wt.%).

Example 25 was a melt reaction at 260° C. of poly(trimethylene 2-methylisophthalate) (7.1 g, 0.033 mole) and poly(4,4'-isopropylidenediphenylene 2-methylisophthalate) (12.0 g, 0.032 mole) in the presence of triphenylphosphine catalyst (0.19 g, 1.0 wt.%).

Example 26 was a melt reaction at 240° C. of the polyesters of Example 23.

Example 27 was a melt reaction at 280° C. of the polyesters of Example 23.

Control runs omitting catalyst were made for each example.

The following Table IV lists the results of the comparative runs. These results illustrate that the triarylphosphine catalyst generally increases randomness, and shortens reaction time at a given B value.

TABLE IV

| Reaction Time (min) | B Values | | | | | | | | | |
|---|---|---|---|---|---|---|---|---|---|---|
| | Example 23 | Control | Example 24 | Control | Example 25 | Control | Example 26 | Control | Example 27 | Control |
| 20 | 0.03 | 0.05 | 0.03 | 0.08 | 0.02 | 0.02 | 0.04 | 0.03 | 0.21 | 0.18 |
| 40 | 0.15 | 0.14 | 0.11 | 0.14 | 0.05 | 0.03 | 0.06 | 0.07 | 0.59 | 0.41 |
| 60 | 0.27 | 0.25 | 0.27 | 0.16 | 0.09 | 0.05 | 0.13 | 0.09 | 0.77 | 0.57 |
| 80 | 0.38 | 0.33 | 0.37 | 0.22 | 0.14 | 0.07 | 0.19 | 0.13 | 0.86 | 0.67 |
| 100 | 0.46 | 0.40 | 0.49 | 0.25 | 0.19 | 0.08 | 0.25 | 0.16 | 0.93 | 0.75 |
| 120 | 0.54 | 0.45 | 0.55 | 0.30 | 0.23 | 0.09 | 0.31 | 0.17 | 0.96 | 0.81 |
| 140 | 0.62 | 0.51 | 0.60 | 0.33 | 0.29 | 0.11 | 0.39 | 0.21 | 0.98 | 0.89 |
| 160 | 0.67 | 0.55 | 0.65 | 0.38 | 0.33 | 0.13 | 0.43 | 0.23 | 0.98 | 0.90 |
| 180 | 0.72 | 0.63 | 0.69 | 0.39 | 0.35 | 0.15 | 0.48 | 0.24 | 0.99 | 0.92 |

EXAMPLE 28

Catalyst Comparison

This is a comparative example like Example 22 except that two polyesters are reacted instead of a polyester and polyester precursors. This example illustrates the improvement in randomness obtained from triphenylphosphine over phosphorus-containing compounds taught in the art. The copolyester of Example 23 was compared to a copolyester (Control A) prepared with 1 wt.% of triphenylphosphate as catalyst and a copolyester (Control B) prepared with 1 wt.% of triphenylphosphite as catalyst. It is clear from the results tabulated in following Table V that triphenylphosphate and -phosphite are poorer melt phase catalysts than triphenylphosphine.

TABLE V

| Time (min) | Copolyester B Values | | |
|---|---|---|---|
| | Example 23 | Control A | Control B |
| 20 | 0.03 | 0.02 | 0.05 |
| 40 | 0.15 | 0.06 | 0.09 |
| 60 | 0.27 | 0.09 | 0.11 |
| 80 | 0.38 | 0.10 | 0.16 |
| 100 | 0.46 | 0.11 | 0.20 |
| 120 | 0.54 | 0.13 | 0.24 |
| 140 | 0.62 | 0.15 | 0.28 |
| 160 | 0.67 | 0.17 | 0.29 |
| 180 | 0.72 | 0.20 | 0.33 |

The invention has been described in detail with particular reference to certain preferred embodiments thereof, but it will be understood that variations and modifications can be effected within the spirit and scope of the invention.

I claim:

1. In a melt phase process for preparing a copolyester in the presence of a catalyst by reacting a first polyester with either a second polyester or polyester precursors, the improvement wherein said catalyst is a triarylphosphine having a boiling point in the range of from about 200° to about 500° C.

2. The process of claim 1 wherein said copolyester is prepared at a temperature in the range of from about 200° to about 300° C. and a pressure in the range of from about 0.001 to about 10 mmHg.

3. The process of claim 1 wherein each of said polyesters has a melting point less than about 500° C. at atmospheric pressure.

4. The process of claim 1 wherein said catalyst has the formula

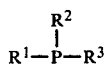

wherein each of $R^1$, $R^2$ and $R^3$ is aryl.

5. The process of claim 1 wherein each of said polyesters has recurring units of the formula

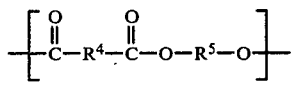

and said polyester precursors have the formulae

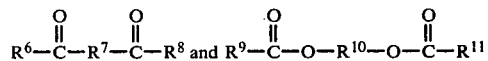

wherein each of $R^4$, $R^5$, $R^7$ and $R^{10}$ is a divalent aliphatic, alicyclic or aromatic radical; each of $R^6$ and $R^8$ is hydroxy or alkoxy; and each of $R^9$ and $R^{11}$ is a monovalent aliphatic, alicyclic or aromatic radical.

6. The process of claim 5 wherein each of $R^4$, $R^5$, $R^7$ and $R^{10}$ is alkylene, cycloalkylene or arylene; each of $R^6$ and $R^8$ is hydroxy; and each of $R^9$ and $R^{11}$ is alkyl, cycloalkyl or aryl.

7. The process of claim 1 comprising the steps of crystallizing and solid phase polymerizing said copolyester.

8. In a melt phase process for preparing a copolyester in the presence of a catalyst by reacting a first polyester with either a second polyester or polyester precursors, each of said polyesters having recurring units of the formula

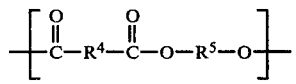

and said polyester precursors having the formulae

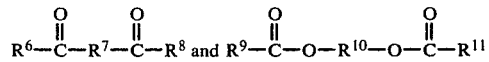

wherein each of $R^4$, $R^5$, $R^7$ and $R^{10}$ is a divalent aliphatic, alicyclic or aromatic radical, each of $R^6$ and $R^8$ is hydroxy or alkoxy; and each of $R^9$ and $R^{11}$ is a monovalent aliphatic, alicyclic or aromatic radical the improvement wherein said catalyst is a triarylphosphine having a boiling point in the range of from about 200° to about 500° C.

9. The process of claim 8 wherein said copolyester is prepared at a temperature in the range of from about 200° to about 300° C. and a pressure in the range of from about 0.001 to about 10 mmHg.

10. The process of claim 8 wherein said catalyst has the formula

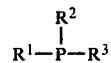

wherein each of $R^1$, $R^2$ and $R^3$ is aryl of 6 to 12 carbon atoms.

11. The process of claim 8 wherein each of said polyesters has a melting point less than about 500° C. at atmospheric pressure.

12. The process of claim 8 wherein said catalyst is present in a concentration in the range of from about 0.1 to about 50 percent, by weight, based on total polyester and polyester precursor.

13. The process of claim 8 wherein each of $R^4$, $R^5$, $R^7$ and $R^{10}$ is alkylene, cycloalkylene or arylene; each of $R^6$ and $R^8$ is hydroxy; and each of $R^9$ and $R^{11}$ is alkyl, cycloalkyl or aryl.

14. The process of claim 8 wherein said copolyester is prepared by reacting two or more polyesters.

15. The process of claim 8 comprising the steps of crystallizing and solid phase polymerizing said copolyester.

16. In a process for preparing a copolyester, said process comprising:
(A) mixing:
(1) a first polyester having recurring units of the formula

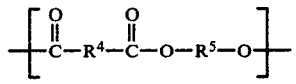

wherein each of $R^4$ and $R^5$ is alkylene, cycloalkylene or arylene; and (2) either a second polyester or at least one polyester precursor described by each of the formulae

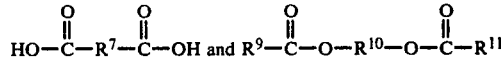

wherein each of $R^7$ and $R^{10}$ is alkylene, cycloalkylene or arylene, and each of $R^9$ and $R^{11}$ is alkyl, cycloalkyl or aryl;

(B) reacting (1) and (2) in a melt phase in the presence of a catalyst; and (C) removing non-polymeric by-products of said reaction whereby reaction equilibrium is driven in the direction of copolyester formation, the improvement wherein said catalyst is a

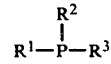

wherein each of $R^1$, $R^2$ and $R^3$ is aryl of 6 to 12 carbon atoms.

17. The process of claim 16 wherein said catalyst is present in a concentration in the range of from about 0.1 to about 10 percent, by weight, based on total polyester and polyester precursor.

18. The process of claim 16 comprising the steps of crystallizing and solid phase polymerizing said copolyester.

19. The process of claim 16 wherein said catalyst is triphenylphosphine.

* * * * *

UNITED STATES PATENT AND TRADEMARK OFFICE
CERTIFICATE OF CORRECTION

PATENT NO. : 4,250,281
DATED : February 10, 1981
INVENTOR(S) : Edgar E. Riecke

It is certified that error appears in the above—identified patent and that said Letters Patent is hereby corrected as shown below:

Column 2, line 43, "tri(m-" should read -- tris(m- --.

Column 7, Table II, Example 10, "tris(m-tolyl)-" should read -- tris(m-tolyl)phosphine --.

Signed and Sealed this

Nineteenth Day of May 1981

[SEAL]

Attest:

RENE D. TEGTMEYER

Attesting Officer    Acting Commissioner of Patents and Trademarks